United States Patent [19]

Miller, Sr.

[11] 4,313,264

[45] Feb. 2, 1982

[54] ALIGNMENT AND COUPLING OF VEHICLES

[76] Inventor: Franklin H. Miller, Sr., P.O. Box 30, Stillvalley Rd., Phillipsburg, RD 1, N.J. 08865

[21] Appl. No.: 56,528

[22] Filed: Jul. 11, 1979

Related U.S. Application Data

[63] Continuation of Ser. No. 804,557, Jun. 7, 1977, abandoned.

[51] Int. Cl.³ .............................................. G01C 15/00
[52] U.S. Cl. .................................. 33/264; 116/28 R; 280/477
[58] Field of Search ............... 33/264, 228; 116/28 R; 280/477; 180/1 AP

[56] References Cited

U.S. PATENT DOCUMENTS

| | | | |
|---|---|---|---|
| 2,815,732 | 12/1957 | Majors | 116/28 R |
| 3,015,162 | 1/1962 | Bohnet | 33/264 |
| 3,765,703 | 10/1973 | Voelkerding | 116/28 R |
| 3,818,599 | 6/1974 | Tague | 280/477 |
| 3,863,594 | 2/1975 | Lawthrop | 33/264 |
| 3,867,898 | 2/1975 | Lakamp | 33/264 |
| 3,889,384 | 6/1975 | White | 33/264 |
| 3,918,746 | 11/1975 | Lehtisaari | 33/264 |
| 3,998,285 | 12/1976 | Cooper | 116/28 R |
| 4,012,056 | 3/1977 | Christensen | 280/477 |
| 4,054,302 | 10/1977 | Cambell | 33/264 |

Primary Examiner—William D. Martin, Jr.
Attorney, Agent, or Firm—George E. Kersey

[57] ABSTRACT

Method and apparatus for the alignment and coupling of vehicles. Indicators which are viewable from an operating position in one of the vehicles are separately affixed to each of the vehicles. The vehicles are then maneuvered to bring the indicators into alignment and permit the coupling of one vehicle to the other.

10 Claims, 4 Drawing Figures

ALIGNMENT AND COUPLING OF VEHICLES

This is a continuation of Ser. No. 804,557, filed June 7, 1977, now abandoned.

BACKGROUND OF THE INVENTION

This invention relates to the alignment and coupling of vehicles, and, more particularly, to the alignment and coupling of wheeled vehicles.

In order to couple vehicles which are initially out of alignment, it is necessary to maneuver one or both until they are in proper position. In the case of vehicles such as trailer and a pulling vehicle, e.g. a truck or tractor, the usual procedure for the alignment and coupling of the trailer to the pulling vehicle requires an observer to direct the operator of the pulling vehicle in maneuvering it with respect to the trailer in order to effect the proper alignment and coupling of the two vehicles.

Not only does this procedure require the services of an observer, it is comparatively unsatisfactory because it is difficult for the observer to relay precise instructions to the operator. The result is that a great deal of time and effort is expended in trial and error maneuvers until the desired alignment is secured. Moreover, where the alignment is attempted under conditions of limited visibility, the amount of trial and error effort can be appreciable, particularly at night where it is difficult for the observer, even when equipped with a flash light or other means of illumination, to provide the proper guidance to the operator.

Accordingly, it is an object of the invention to expedite the alignment of initially non-aligned vehicles. A related object is to expedite the alignment of non-aligned wheeled vehicles. Another related object is to expedite the alignment of a trailer with the vehicle by which it is drawn, e.g. tractor.

A further object of the invention is to facilitate the coupling of initially non-aligned vehicles. A related object is to facilitate the coupling of non-aligned wheeled vehicles. Another related object is to facilitate the alignment of a trailer with its tractor.

An additional object of the invention is to facilitate the alignment and coupling of vehicles without requiring the services of a non-operating observer. A related object is to achieve the desired alignment and coupling of vehicles by the operator of one of the vehicles acting along.

Another object of the invention is to achieve the alignment and coupling of an attended vehicle with a non-attended vehicle using special purpose equipment which is in a functioning position only during the alignment and coupling operation, and is otherwise positioned where it will not interfere with the ordinary operations of the vehicles. A related object is to achieve the alignment and coupling of vehicles making use of special purpose equipment which is functional only when an alignment and coupling operation is being undertaken but which is otherwise readily accessible for use at any time.

SUMMARY OF THE INVENTION

In accomplishing the foregoing and related objects, the invention provides indicator members which are affixed to the vehicles being aligned and coupled and viewable from the operator position of one of the vehicles.

In accordance with one aspect of the invention, each indicator member is in the form of an extendable telescoping rod that is affixed to the coupling position of one of the vehicles and to the coupler position of the other vehicle.

In accordance with a further aspect of the invention, each indicator member is collapsible into a housing at the coupling and coupler positions of the vehicles to occupy a comparatively small space.

In accordance with yet another aspect of the invention, the indicator of the coupled vehicle is at a hitch position, while the indicator for the coupling vehicle is at the hitching position.

In accordance with still another aspect of the invention, the tip of each indicator rod is provided with a source of illumination, such as a lamp, so that the desired alignment and coupling can take place under conditions of limited visibility, for example at night.

DESCRIPTION OF THE DRAWINGS

Other aspects of the invention will become apparent after considering several illustrative embodiments taken in conjunction with the drawings, in which.

DETAILED DESCRIPTION

Figure 1A:
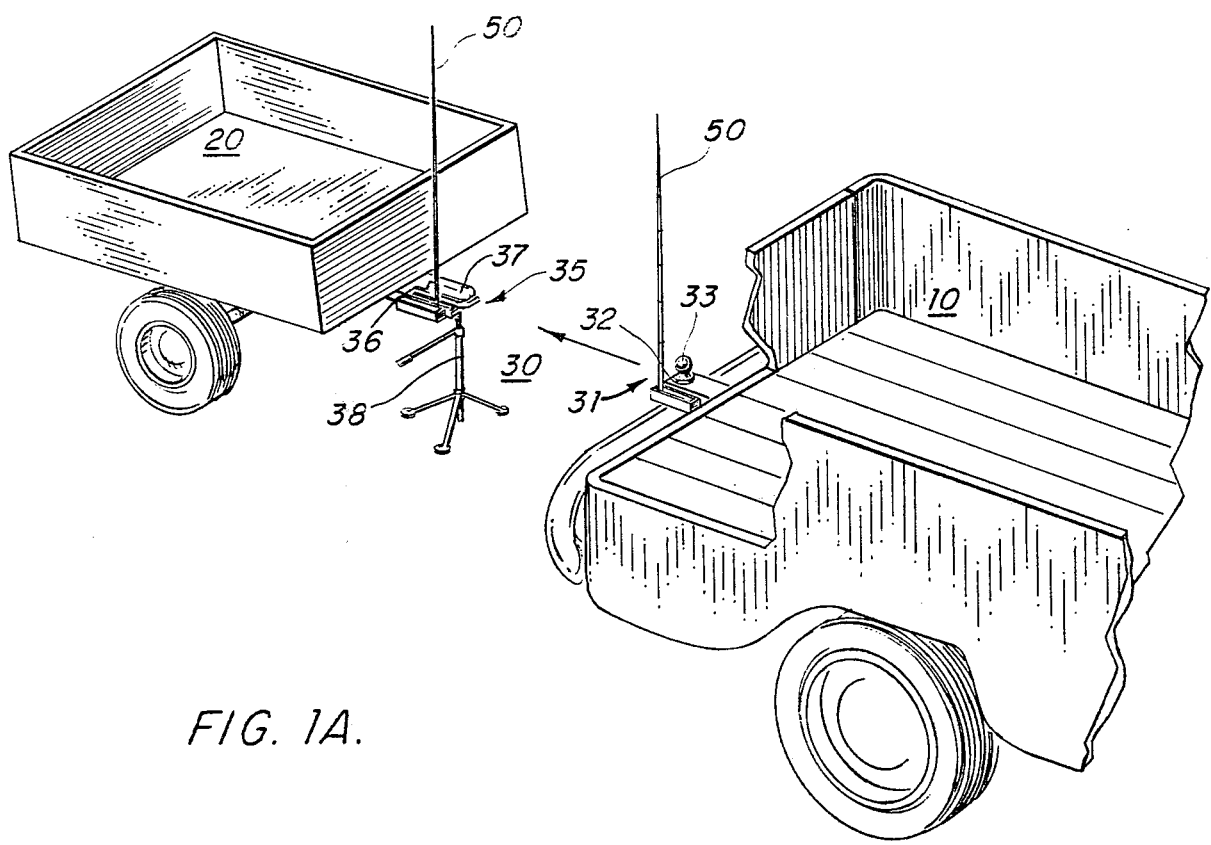
FIG. 1A is a perspective view of a trailer and a tractor preparatory to being aligned in accordance with the invention.

Turning to the drawings, FIG. 1A illustrates two vehicles which are to be aligned and coupled in accordance with the invention. For illustration, the particular vehicles of FIG. 1A are a pickup truck 10 and a two-wheel trailer 20. It will be understood that the alignment technique in accordance with the invention can be practiced with any initially non-aligned vehicles, including those for sea and air travel, as well as a wide variety of wheeled vehicles customarily used in land travel.

The truck 10 is adapted to be coupled to the trailer 20 by means of a standard two-part coupling device 30 which is commonly known as a trailer hitch. One part 31 of the trailer hitch is attached to the truck, while the other part 35 is attached to the trailer. The coupling part 31 includes an arm 32 and a ball 33. The coupled part 35 includes an arm 36 and a cup 37 for receiving the ball 33. In addition, to facilitage the coupling of the two vehicles, a jack 38 is included with the trailer 20 to allow the hitch 35 to be raised to a proper level. The jack 38 is an accessory and can be included as a working part of the arm 36.

Even when the jack 38 is used to position the hitch 35 at the proper level for coupling with the ball 33, the coupling operation requires relatively precise alignment between the truck 10 and trailer 20. In the absence of such alignment, movement of the truck 10 in the direction indicated by the arrow could upset the trailer 20. Accordingly, it is a customary practice to have an observer assist the operator of the truck 10 in maneuvering the vehicle into proper position for coupling. Unfortunately there are many occasions when the observer is unavailable, or when present, is unable to give concise and precise instructions to the operator for the desired maneuvering of the vehicle 10 into position.

The invention overcomes the disadvantages that have heretofore existed in the alignment and coupling of vehicles and eliminates the need for the observer by the inclusion of an indicator 50 with each of the vehicles. As shown in FIG. 1A, an indicator 50 is affixed to the coupler portion 35 of the hitch 30, while a similar indicator 50 is affixed to the coupling portion 31 on the other vehicle.

The indicator members 50 are rod-like in extended configuration so that both of them are easily viewed from the cab or operating position of the truck 10.

Figure 1B:
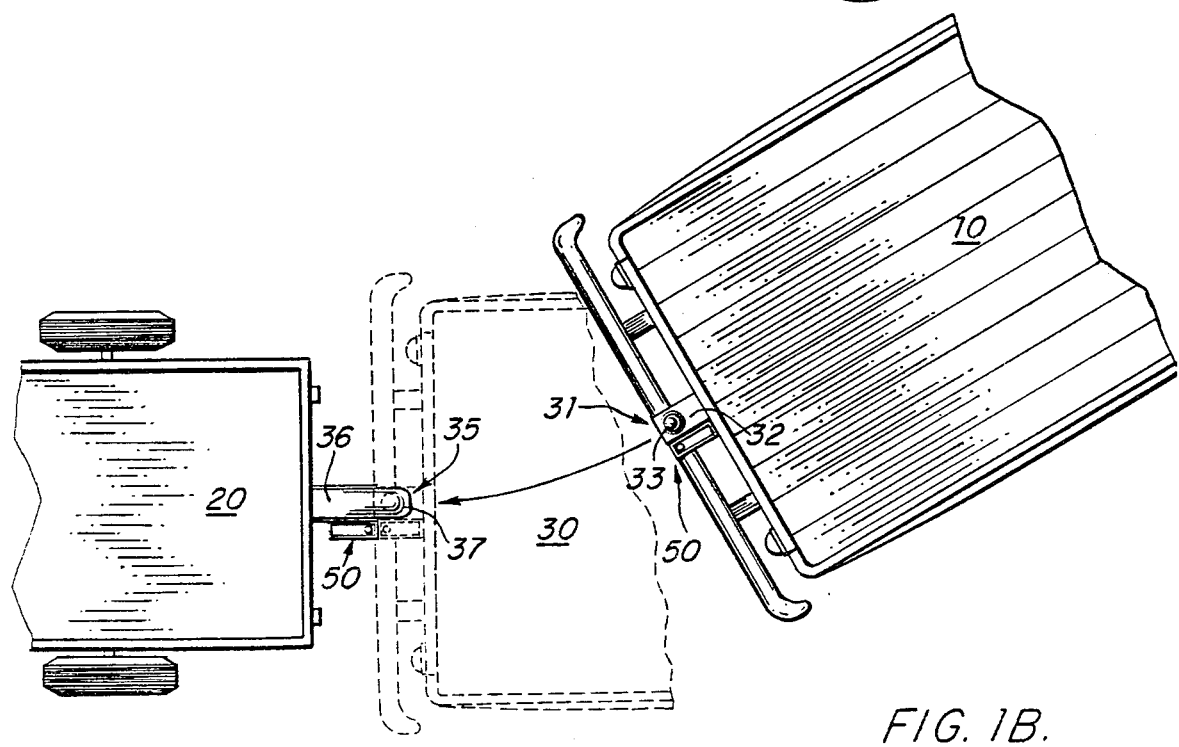
FIG. 1B is a plan view of the vehicles of FIG. 1A illustrating the coupling of the two vehicles.

As indicated in FIG. 1B, the operator of the truck 10, with both indicators 50 in view, maneuvers the truck 10 with respect to the trailer 20 until the indicators are in alignment with one another, as shown by the phantom position of the truck 10, whereupon the ball 33 readily enters the socket or cup 37 and the desired coupling of the two veicles is achieved.

Figure 2A:
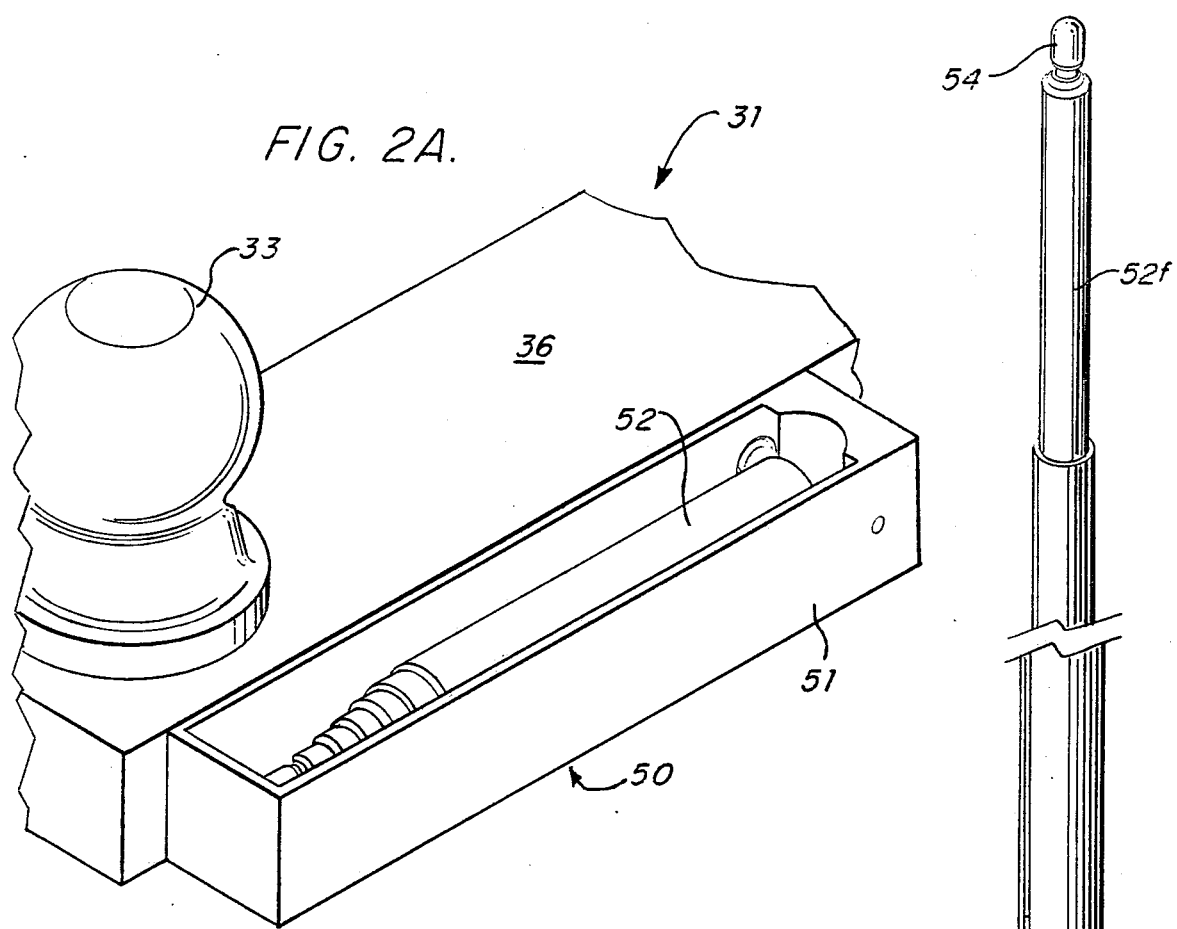
FIG. 2A is a partial perspective view of a coupling member for one of the vehicles of FIG. 1A, with an illustrative indicator member in accordance with the invention in a storage housing preparatory to being used.
Figure 2B:
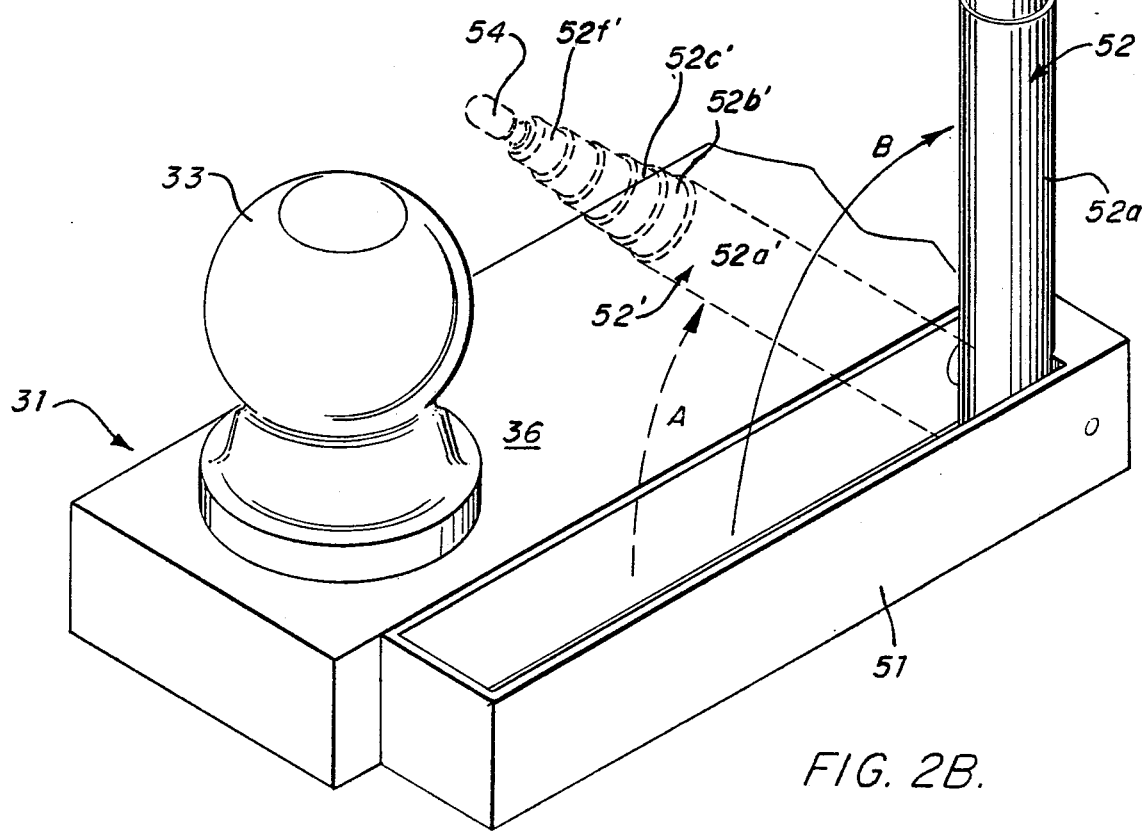
FIG. 2B is a perspective view of the assemblage of FIG. 2A showing an indicator member in the course of being pivoted from its housing and extended for use in accordance with the invention.

Details of illustrative indicators 50 are shown in FIGS. 2A and 2B. While the indicator 50 of FIG. 2A is identical to those of FIGS. 1A and 1B, it is mounted, an alternative embodiment, so that the extended rod portion is not adjacent to the ball 33 but is instead displaced along the length of the arm 36. The particular orientation of FIG. 1A can be achieved by the simple expedient of reversing the housing 51.

The indicator rod 52 is shown in its completely collapsed position within the housing 51 in FIG. 2A. To practice the invention, the collapsed rod 52 is elevated as shown in FIG. 2B to the phantom position indicated by the arrow A and finally to the fully elevated position indicated by the arrow B. The rod 52 is of a standard telescopable construction is formed from a set of segments which are nested within one another and can be extended by grasping the end of the rod and imparting an outward axial component of motion to it. When this is done, the rod extends from a base tubular member 52a through an outermost tip portion to 52f. Also indicated in FIGS. 2A and 2B is the inclusion of an illumination member 54 at the end of the innermost extension member 52f. This is provided so that the rod can be illuminated in standard fashion to permit the practice of the invention under conditions of adverse visibility, such as at night.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. Apparatus for aligning two initially non-aligned vehicles having a coupling or tongue on at least one of the vehicles, comprising an indicator unit on each vehicle, each unit being formed by a housing containing at least two telescopically extensible segments, including a base tubular segment that is hingeably positioned in said housing, and a tip segment;

and means for mounting the housings with their longitudinal axes spaced equally from the same side of the longitudinal axis of the vehicles on which they are mounted.

2. Apparatus as defined in claim 1 wherein the end of said tip segment includes an illumination member.

3. Apparatus as defined in claim 2 wherein said illumination member comprises a light.

4. Apparatus as defined in claim 1 wherein said vehicles include coupling means and said housing is mounted on an axis which is displaced from said coupling means.

5. Apparatus as defined in claim 4 wherein said housing is mounted with its major axis parallel to the major axis of said coupling means.

6. Apparatus as defined in claim 4 wherein said housing is mounted to one side of said coupling means to serve as a guide in the alignment of said vehicles.

7. Apparatus as defined in claim 1 wherein said base segment is hingeably positioned in said housing in the portion thereof closest to the body of the vehicle to which said housing is attached.

8. Apparatus as defined in claim 1 wherein said base segment is hingeably positioned in said housing of the portion thereof farthest from the body of the vehicle to which said housing is attached.

9. Apparatus as defined in claim 1 wherein said housing has the configuration of the telescopically collapsed segments.

10. Apparatus as defined in claim 9 wherein said housing has parallel side walls and said base tubular segment is hingeably connected by a pin passing through said side walls.

* * * * *